United States Patent [19]

Gerber et al.

[11] 3,941,205

[45] Mar. 2, 1976

[54] METHOD AND MEANS FOR CONTROLLING THE AIR PRESSURE IN A SOUND-PROOFED HANGAR FOR TESTING JET ENGINES

[75] Inventors: Oskar Gerber, Krailling, Germany; Karl Gősta Agmén, Eskilstuna, Sweden

[73] Assignee: Granges Nyby AB, Sweden

[22] Filed: June 25, 1974

[21] Appl. No.: 483,042

[30] Foreign Application Priority Data

May 7, 1974 Germany ........................ 2422025

[52] U.S. Cl. ........................................ 181/33 HB

[51] Int. Cl.² ........................ E04H 6/44; F02K 1/26

[58] Field of Search ...... 181/33 HB, 33 HC, 51, 52; 52/86

[56] References Cited

UNITED STATES PATENTS

| | | | |
|---|---|---|---|
| 2,979,151 | 4/1961 | Blackwell et al. | 181/33 HC UX |
| 3,349,868 | 10/1967 | Kurtze | 181/33 HB UX |

FOREIGN PATENTS OR APPLICATIONS

| | | | |
|---|---|---|---|
| 1,273,167 | 7/1968 | Germany | 181/33 HB |
| 661,690 | 4/1963 | Canada | 181/33 HD |
| 1,197,599 | 7/1970 | United Kingdom | 181/33 HC |
| 442,705 | 1/1968 | Switzerland | 181/33 HB |

*Primary Examiner*—John F. Gonzales
*Attorney, Agent, or Firm*—Craig & Antonelli

[57] ABSTRACT

A method and means of controlling the air pressure in a sound-proofed hangar in which jet engines are tested, the amount of cooling air sucked into the exhaust gas silencer by the injection action of the exhaust gas jet being adjusted by varying the flow resistance or the free flow cross-section of the area difference between the inlet cross-section of the exhaust gas silencer and the exhaust jet cross-section by inserting screens so that the pressure in the sound-proofed hangar does not drop below a predetermined value.

38 Claims, 4 Drawing Figures

11
6
3
4
10
18
18
5

63
16
15
53
16
15
43
16
15
33
15
23
15

9
10
8
13'
16'
26'
26
26'
26
16
13
15
15

METHOD AND MEANS FOR CONTROLLING THE AIR PRESSURE IN A SOUND-PROOFED HANGAR FOR TESTING JET ENGINES

The present invention relates to a method of controlling the air pressure in a sound-proofed hangar in which jet engines are tested, the exhaust gas jet of at least one jet engine being conducted via an exhaust gas silencer out of the hangar into the atmosphere.

Jet engines which are tested in a sound-proofed hangar are generally arranged so that their exhaust jet is conducted via an exhaust silencer to the atomosphere. The thrust pipe of the jet engine is not connected directly to the silencer but is disposed a slight distance from the inlet opening thereof. This results in an annular gap through which the cooling air is sucked into the silencer. This admixture of the cooling air is necessary to ensure that the hot exhaust jet does not damage the inner surfaces of the silencer with which said jet comes into contact after leaving the thrust pipe. The mixing of the cooling air with the hot exhaust jet leads however to turbulence formation of the gas mixture and represents one of the main causes of noise in jet engines.

To overcome this defect it is known to provide in the passage of absorption silencers through which the exhaust jet flows with full thrust grid structures which have a rectifying effect on the exhaust gas flow and influence the admixture of the cooling air in such a manner that turbulence is reduced. Such structures have however the disadvantage that they can easily be destroyed by the hot and dynamic exhaust gas jet.

A general disadvantage of the known silencer arrangements is that in the sound-proofed hangar in which the jet engines are tested a pressure drop is produced which may become so high that the jet engines no longer function satisfactorily. This is for example the case when the pressure drops by more than 100 mm $H_2O$ (water column). If the pressure drops too much there is also an unfavorable effect on the doors, walls, windows and suction panels or slats of the hangar, in which vibratory stresses may occur. Finally, the pressure drop must be kept within limits for physiological reasons with regard to the personnel working in the hangar.

A known sound-proofed hangar which is provided with a roof structure resting on supports (DT-AS 1,273,167) contains an exhaust gas silencer which is built into the rear wall of the hangar, the remaining walls consisting of separate sound-absorbing sections or panels which are variable in position and arranged in spaced relationship. This hangar has the disadvantage that the cooling air flowing through the exhaust gas silencer cannot be adjusted.

An object of the present invention is to provide a method with the aid of which the necessary air pressure can be maintained in a sound-proofed hangar.

According to the method of the invention this object is achieved in that the amount of cooling air sucked into the exhaust gas silencer by the injection action of the exhaust gas jet is adjusted by varying the flow resistance or the free flow cross-section of the area difference between the inlet cross-section of the exhaust gas silencer and the exhaust jet cross-section so that the pressure in the sound-proofed hangar does not drop below a predetermined value.

The method according to the invention has the advantage that both the amount of cooling air supplied to the silencer and the pressure in the hangar are adjustable in such a manner that both the silencer and the engine to be tested operate satisfactorily and simultaneously the pressure drop in the hangar is prevented from exceeding an amount injurious to the operating personnel. Advantageously, the amount of cooling air sucked in by the exhaust gas silencer is regulated so that the mixture ratio of cooling air to exhaust gas in socalled "hot engines", the jet engines, is 1:1 to 3:1, i.e. in such jet engines the proportion of cooling air may be up to three times the proportion of exhaust gas. In socalled "cold engines", which are generally referred to as fan engines, the ratio of the amount of cooling air to the amount of exhaust gas may be 1:1 or even less, down to 0.6:1, preferably being 0.8:1 to 0.9:1.

Preferably, the variation of the flow resistance or of the free flow cross-section of the area difference between the inlet cross-section of the silencer and the gas jet cross-section is effected by inserting screens of different size and/or different perforation.

In addition to the flow resistance of the area difference between the inlet cross-section of the silencer and the cross-section of the exhaust jet, advantageously the flow resistance of sound-absorbing adjustable panels forming at least part of the walls of the hangar and/or the free flow cross-section between said panels is adjusted so that the pressure drop in the hangar does not exceed a predetermined amount, preferably 100 mm $H_2O$.

Another object of the present invention resides in providing a hangar for carrying out the method according to the invention in which the rear wall is provided with an exhaust gas silencer via which the exhaust gas jet of at least one jet engine is conducted into the atmosphere, at least a part of the remaining walls consisting of sound-absorbing sections or panels, said hangar being characterized in that the flow resistance or the free flow cross-section of the area difference between the inlet cross-section of the exhaust gas silencer and the exhaust jet cross-section is variable by inserting screens and that the sound-absorbing panels are movably arranged in such a manner that the cross-section for the inflowing air is adjustable.

Screens of various sizes or having various degrees of perforation are kept available, preferably in the form of a screen set, the screens either being adapted to the various types of jet engines to be tested or be so closely graded in size and/or perforations and/or conicity that they permit continuous variations of the free flow cross-section.

By using screens of different perforation and/or different conicity and/or different size it is possible not only to set the amount of cooling air required for cooling the silencer to an optimum value as regards noise formation but simultaneously to regulate the turbulence formation and the frequency spectrum of the noise generated in such a manner that the noise level is reduced.

The interchangeable screens are set up in the form of a truncated cone which is arranged so that it surrounds the exhaust gas jet concentrically and its smaller opening faces the thrust tube opening of the engine. The screens may be made of solid or perforated sheet metal.

Instead of a set of different screens, screens may also be used which are of variable size and/or have variable perforation. Such screens consist preferably of two or more conical ring members which are adapted to be telescoped together or moved apart and which are connected together by means of connecting bolts or the like guided in slots. Bores of various sizes may also be completely or partially closed by displacing screen portions in order to vary the flow resistance in this manner.

Another object of the present invention resides in providing an exhaust gas silencer for conducting the exhaust gas jet of a jet engine out of a sound-proofed hangar used for testing jet engines into the atmosphere which is characterized in that the flow resistance or the free flow cross-section of the area difference between the exhaust gas silencer and the exhaust gas jet cross-section is variable in the manner described above by inserting screens.

These and other objects, features and advantages of the present invention will become more apparent from the following description when taken in connection with the accompanying drawing which shows, for the purpose of illustration, an embodiment in accordance with the present invention, and wherein.

Figure 1:
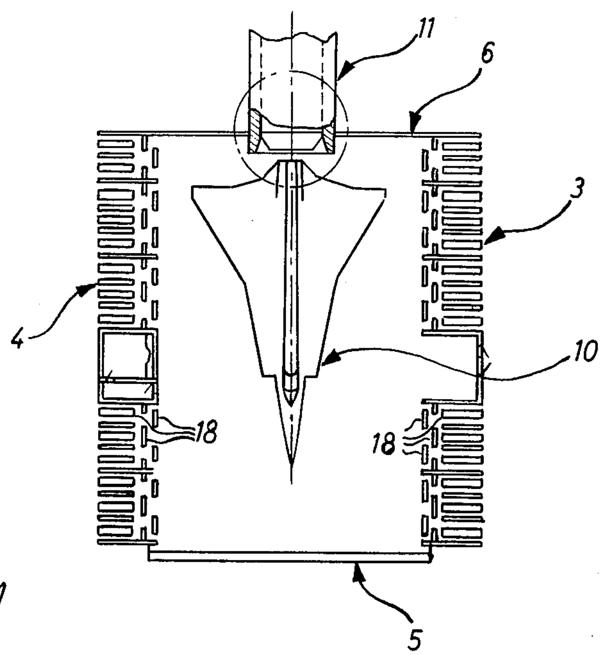
FIG. 1 is a plan view in section of a test stand for a jet aircraft.
Figure 2:
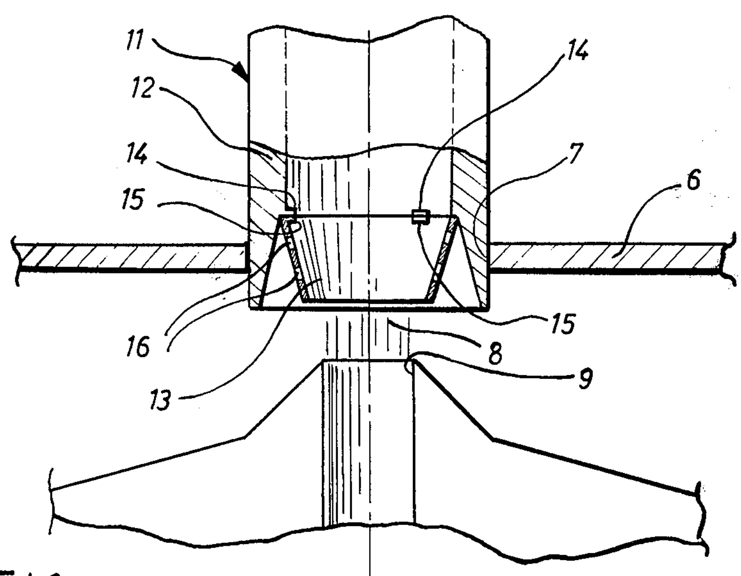
FIG. 2 shows the tail portion of the aircraft with silencer on a relatively enlarged scale.
Figure 3:
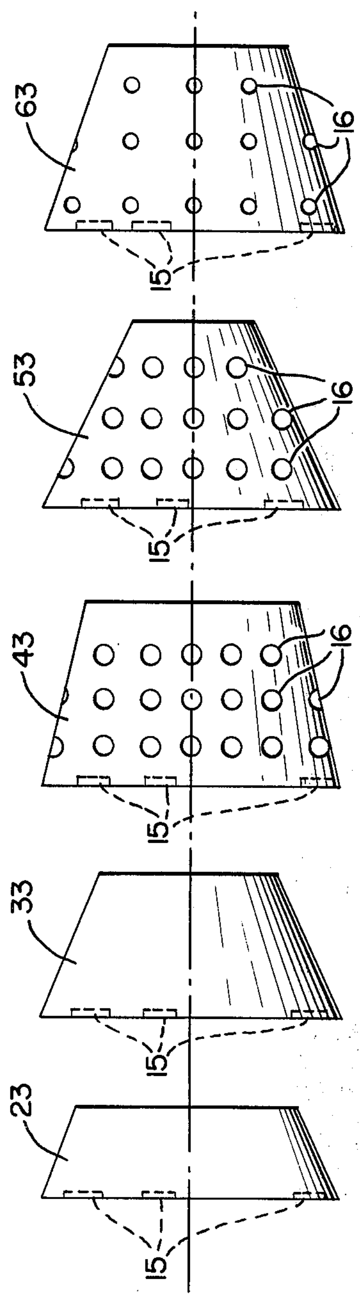
FIG. 3 shows a set of screens in accordance with the present invention.

The hangar 1 is constructed as sound-proofed shed and comprises side walls 3 and 4 consisting of separate sound-dampening or sound-absorbing sections or panels and a door 5. The rear wall 6 of the hangar comprises an outlet opening 7 for the exhaust gas 8 of a jet engine of an aircraft 10. The exhaust gas jet 8 leaves the engine through the thrust pipe 9. Disposed in the outlet opening 7 of the hangar 1 is the silencer 11. It consists of a cylindrical tube 12 which is arranged concentrically to the jet 8. A conical screen 13 is adapted and secured to the cylindrical tube 12 in such a manner that said screen cannot be loosened or displaced by the pressure of the jet 8. This may for example be done by means of a row of noses 14 which are provided in the cylindrical tube 12 and on which the screen 13 is mounted with noses 15 and possibly secured by securing means (not illustrated) such as screws. In the example illustrated (FIG. 2) the screen is perforated and its holes are denoted by 16. The screen may be easily interchanged and can as required be replaced by another screen of a different conicity, different length or different perforation. For example, a set of screens such as shown in FIG. 3 can be kept at hand. Such a set might include two screens 23 and 33 having a different size but identical conicity. Two screens 43 and 53 can have identical perforations but different conicity, whereas screens 53 and 63 have both different conicity and different perforations. In FIG. 2 the area difference between the inlet opening of the silencer 11 and the exhaust gas jet cross-section is occupied entirely by the cross-sectional area of the screen 13 and consequently the cooling air flow produced by the injection action of the exhaust gas jet can enter only through the holes 16 in the screen 13.

The arrangement according to the invention functions as follows:

When the exhaust gas jet 8 of the engine enters the conical screen 13 axially an injector effect is produced which results in cooling air being inspired through the gap between the smallest diameter of the screen 13 and the internal diameter of the tube 12. If the screen cone is made from unperforated sheet metal it greatly reduces the cross-sectional area of the air intake. If on the other hand the screen cone is made from perforated sheet metal, as illustrated, the intake area is somewhat increased because additional cooling air can enter through the holes due to the pressure differences. The amount of cooling air required for various types of jet engine varies and apart from depending on the dimensions of the thrust pipe and on the exhaust gas velocity depends substantially on the temperature of the exhaust gas jet. On the other hand, the noise level produced is largely a function of the inflowing amount of cooling air because as the amount thereof increases the turbulence of the gas mixture also increases. Apart from the greater noise formation, in particular at low frequencies, with relatively large consumptions of cooling air the air pressure conditions within the hangar are considerably impaired. Consequently, the possibility of setting the minimum amount of air required results in a reduction of the noise level apart from enabling as desired the necessary pressure to be maintained in the hangar.

The amount of cooling air required by the silencer is ensured by correspondingly setting the position of the adjustable sections or panels 18 in the side walls of the hangar. The free flow cross-sectional area between the individual panels is chosen so that the pressure in the hangar is below the outside atmospheric pressure by an amount of approximately 100 mm $H_2O$.

The angle, length and degree of perforation of the screen are decisive for the air flow. By correctly selecting these parameters the amount of cooling air supplied to the silencer may be correctly set for each engine.

Figure 4:
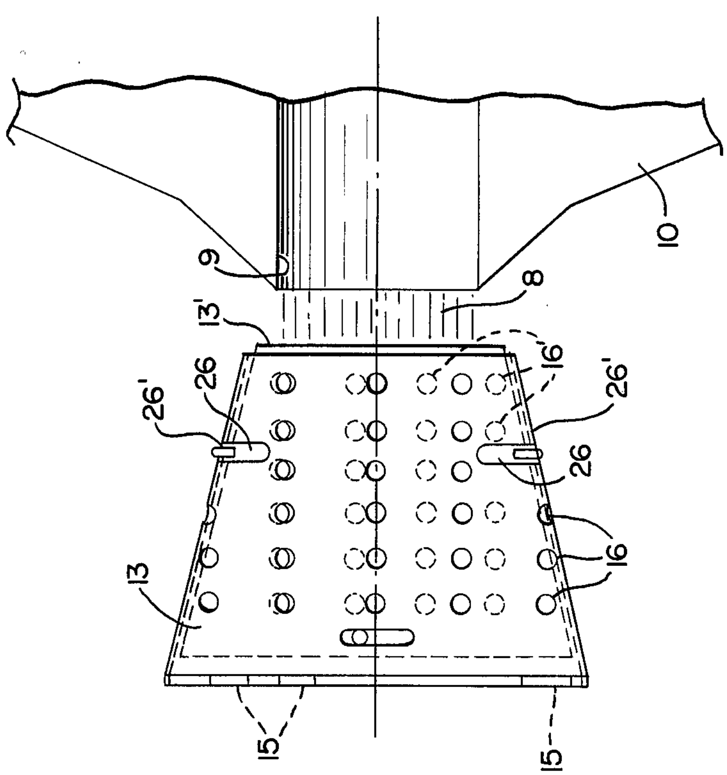
FIG. 4 is a plan view of an embodiment of a screen comprising two ring portions.

FIG. 4 shows one embodiment of a screen consisting of two mutually displaceable conical ring portions 13, 13' inserted into each other in the axial direction and connected together by means of connection bolts 26' guided in slots 26. By displacing the ring portions 13, 13' the recesses or bores 16, 16' of the ring portions 13, 13' may be completely or partially closed, and thus the flow resistance may be varied in a substantially continuous manner without replacing the screens.

As is readily apparent, when the greatest diameter of the screen 13 is smaller than the internal diameter of the cylindrical tube 12 air can also enter the silencer 11 through the annular gap between the screen 13 and the tube 12. The screen is generally made of steel sheet having a thickness of 5 to 15 mm.

Although several embodiments in accordance with the present invention have been shown and described above, it is understood that the same is not limited thereto but is susceptible of numerous changes and modifications known to those skilled in the art and the invention is therefore not intended to be limited to the specific terms and details described and shown herein but to cover all such changes and modifications as are encompassed by the scope of the appended claims.

What we claim is:

1. A sound-proofed hangar for testing jet engines, the hangar rear wall being provided with an exhaust gas silencer through which the exhaust gas jet of at least one jet engine is conducted into the atmosphere, at least a part of the other walls consisting of sound-absorbing sections, characterized in that screens are provided for varying the flow resistance or the free flow cross-section of the area difference between the inlet cross-section of the exhaust gas silencer and the exhaust jet cross-section, said screens having different diameters at the axially opposite openings thereof with the smaller diameter being located closer to the thrust pipe opening of the jet engine and that the sound-absorbing sections are movably arranged in such a manner that the cross-section for the inflowing air is adjustable.

2. A sound-proofed hangar according to claim 1, characterized in that the screens have the form of a truncated cone which is so arranged that it surrounds the exhaust jet concentrically.

3. A sound-proofed hangar according to claim 1, characterized in that a set of interchangeable screens is provided which have a different flow resistance.

4. A sound-proofed hangar according to claim 3, characterized in that the screens consist of perforated sheet metal.

5. A sound-proofed hangar according to claim 1, characterized in that the screens consist of two or more mutually displaceable conical ring portions which are connected together by means of connection bolts guided in slots.

6. A sound-proofed hanger according to claim 5, characterized in that the screens have recesses which are completely or partially closable by displacing the ring portions.

7. A sound-proofed hangar according to claim 1, characterized in that a set of interchangeable screens is provided which have a different conicity.

8. A sound-proofed hangar according to claim 7, characterized in that the screens consist of unperforated sheet metal.

9. A sound-proofed hangar according to claim 1, characterized in that a set of interchangeable screens is provided which have a different flow resistance and different conicity.

10. An exhaust gas silencer for conducting the exhaust gas jet of a jet engine out of a sound-proofed hangar serving to test jet engines into the atmosphere, characterized in that screens are provided on the silencer for varying the flow resistance or the free flow cross-section of the area difference between the inlet cross-section of the exhaust gas silencer and the exhaust jet cross-section, wherein said screens have different diameters at the axially opposite openings thereof with the smaller diameter being located closer to the thrust pipe opening of the jet engine.

11. An exhaust gas silencer according to claim 10, characterized in that the screens have the form of a truncated cone which is so arranged that it surrounds the exhaust gas jet concentrically.

12. An exhaust gas silencer according to claim 10, characterized in that a set of interchangeable screens is provided which have a different flow resistance.

13. An exhaust gas silencer according to claim 12, characterized in that the screens consist of perforated sheet metal.

14. An exhaust gas silencer according to claim 10, characterized in that the screens consist of two or more mutually displaceable conical ring portions which are connected together by means of connecting bolts guided in slots.

15. An exhaust gas silencer according to claim 14, characterized in that the screens have recesses which are completely or partially closable by displacing the ring portions.

16. An exhaust gas silencer according to claim 10, characterized in that a set of interchangeable screens is provided which have different conicity.

17. An exhaust gas silencer according to claim 16, characterized in that the screens consist of unperforated sheet metal.

18. An exhaust gas silencer according to claim 10, characterized in that a set of interchangeable screens is provided which have a different flow resistance and different conicity.

19. A method of controlling the air pressure in a sound-proofed hangar in which jet engines are tested, comprising the steps of conducting the exhaust gas jet of at least one jet engine through an exhaust gas silencer out of the hangar into the atmosphere, sucking an amount of cooling air into the exhaust gas silencer by the injection action of the exhaust gas jet, and adjusting said amount of cooling air by varying the flow resistance or the free flow cross-section of the area difference between the inlet cross-section of the exhaust gas silencer and the exhaust jet cross-section by means of screens of a predetermined flow resistance having the form of a truncated cone with the smaller opening facing the thrust pipe opening of the jet engine and being releasably connected with the exhaust gas silencer so that the air pressure in the hangar does not drop below a predetermined value.

20. A method according to claim 19, wherein the air pressure in the hangar is controlled such that the pressure drop does not exceed 100 mm $H_2O$.

21. A method according to claim 19, wherein the screens consist of perforated sheet metal.

22. A method according to claim 19, wherein the screens consist of inperforated sheet metal.

23. A method according to claim 19, wherein screens of different size are used.

24. A method according to claim 19, wherein screens of different conicity are used.

25. A method according to claim 19, wherein screens consisting of perforated sheet metal and having different perforations are used.

26. A method of controlling the air pressure in a sound-proofed hangar in which jet engines are tested comprising the steps of conducting the exhaust gas jet of at least one jet engine through an exhaust gas silencer out of the hangar and into the atmosphere, sucking an amount of cooling air into the exhaust gas silencer by the injection action of the exhaust gas jet, and adjusting said amount of cooling air by varying the flow resistance or the free flow cross-section of the area difference between the inlet cross-section of the exhaust gas silencer and the exhaust jet cross-section by means of a set of interchangeable screens having the form of a truncated cone with different flow resistances arranged adjacent to the inlet opening of the exhaust gas silencer so as to surround the exhaust gas jet concentrically with the smaller opening facing the thrust pipe opening of the jet engine and being releasably connected with the exhaust gas silencer so that the air pressure in the hangar does not drop below a predetermined value.

27. A method according to claim 26, wherein the screens have a predetermined flow resistance such that the pressure drop in the sound-proofed hangar does not exceed 100 mm $H_2O$.

28. A method according to claim 27, wherein the screens consist of unperforated sheet metal.

29. A method according to claim 27, wherein the screens consist of perforated sheet metal.

30. A method according to claim 27, wherein the screens comprise a set of different size screens.

31. A method according to claim 27, wherein the screens comprise a set of screens of different conicity.

32. A method according to claim 27, wherein the screens comprise of a set of screens with different perforations.

33. A method of controlling the air pressure in a sound-proofed hangar in which jet engines are tested comprising the steps of conducting the exhaust gas jet of at least one jet engine through an exhaust gas silencer out of the hangar and into the atmosphere, sucking an amount of cooling air into the exhaust gas silencer by the injection action of the exhaust gas jet, and adjusting the amount of cooling air by varying the flow resistance or the free flow cross-section of the area difference between the inlet cross-section of the exhaust gas silencer and the exhaust jet cross-section by means of screens arranged adjacent to the inlet opening of the exhaust gas silencer so as to surround the exhaust gas jet concentrically with the smaller opening thereof facing the thrust pipe opening of the jet engine, the screens having at least two mutually displaceable conical ring portions releasably connected with the exhaust gas silencer and connected together by connection bolts guided in slots, wherein the air pressure in the hangar does not drop below a predetermined value.

34. A method according to claim 33, wherein the ring portions have bores which can be at least partially closed by displacing the screen portions.

35. A method according to claim 33, wherein the air pressure in the hangar is controlled such that the pressure drop does not exceed 100 mm $H_2O$.

36. A method of controlling the air pressure in a sound-proofed hangar in which jet engines are tested, comprising the steps of conducting the exhaust gas jet of at least one jet engine through an exhaust gas silencer out of the hangar and into the atmosphere, sucking an amount of cooling air into the exhaust gas silencer by the injection acting of the exhaust gas jet, adjusting the amount of cooling air by varying the flow resistance or the free flow cross-section of the area difference between the inlet cross-section of the exhaust gas silencer and the exhaust jet cross-section by means of at least one screen having the form of a truncated cone with the smaller opening facing the thrust pipe opening of the jet engine and arranged adjacent to the inlet opening of the exhaust gas silencer so as to surround the exhaust gas concentrically, and varying the flow resistance of sound-absorbing adjustable panels forming at least a portion of the hangar walls or varying the free flow cross-section between the panels such that the air pressure in the hangar does not drop below a predetermined value.

37. A method according to claim 36, wherein the air pressure in the hangar is controlled such that the pressure drop does not exceed 100 mm $H_2O$.

38. A method according to claim 36, wherein a plurality of screens is provided having different flow resistances and being releasably connected with the exhaust gas silencer, and wherein the flow resistance of the panels is varied by adjusting the panels such that the free flow cross-section between the panels is adjusted for the inflowing air.

* * * * *